(12) United States Patent
Shingai et al.

(10) Patent No.: US 12,542,002 B2
(45) Date of Patent: Feb. 3, 2026

(54) PHOTOGRAPHING SYSTEM AND PHOTOGRAPHING METHOD

(71) Applicant: NEC Corporation, Tokyo (JP)

(72) Inventors: Misuzu Shingai, Tokyo (JP); Katsuya Nakashima, Tokyo (JP); Honami Suzuki, Tokyo (JP); Takeo Tamura, Tokyo (JP); Masatoshi Sugisawa, Tokyo (JP); Shinji Kubotani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/863,399

(22) PCT Filed: May 9, 2023

(86) PCT No.: PCT/JP2023/017487
§ 371 (c)(1),
(2) Date: Nov. 6, 2024

(87) PCT Pub. No.: WO2023/233943
PCT Pub. Date: Dec. 7, 2023

(65) Prior Publication Data
US 2025/0349156 A1    Nov. 13, 2025

(30) Foreign Application Priority Data
May 31, 2022    (JP) ................... 2022-088468

(51) Int. Cl.
*G06V 40/60* (2022.01)
*G06V 40/10* (2022.01)
(Continued)

(52) U.S. Cl.
CPC ............ *G06V 40/67* (2022.01); *G06V 40/117* (2022.01); *H04N 23/64* (2023.01); *H04N 23/695* (2023.01)

(58) Field of Classification Search
CPC .... G06V 40/67; G06V 40/117; H04N 23/695; H04N 23/64
See application file for complete search history.

(56) References Cited

U.S. PATENT DOCUMENTS

2005/0286744 A1    12/2005    Yoshizu et al.
2006/0023919 A1    2/2006    Okamura et al.
(Continued)

FOREIGN PATENT DOCUMENTS

GB    2598016 A    2/2022
JP    2006-042880 A    2/2006
(Continued)

OTHER PUBLICATIONS

International Search Report for PCT Application No. PCT/JP2023/017487, mailed on Aug. 1, 2023.
(Continued)

*Primary Examiner* — Kathleen V Nguyen

(57) ABSTRACT

A photographing system (101) according to an aspect of the present disclosure includes a photographing means (11), a guiding means (12), and a photographing range adjustment means (13). The photographing means (11) photographs a hand of a user. The guiding means (12) displays a guiding image serving as a mark for the user for guiding a position of his/her hand. Further, the guiding means (12) moves a position at which the guiding image is displayed. The photographing range adjustment means (13) adjusts a photographing range of the photographing means (11) to a range corresponding to the position at which the guiding image is displayed.

10 Claims, 11 Drawing Sheets

(51) Int. Cl.
*H04N 23/60* (2023.01)
*H04N 23/695* (2023.01)

(56) References Cited

U.S. PATENT DOCUMENTS

2006/0080547 A1  4/2006  Higashiura et al.
2019/0236252 A1* 8/2019  Maeda ............... G06V 40/1365

FOREIGN PATENT DOCUMENTS

| JP | 2006-139592 A | 6/2006 |
| JP | 2017-107218 A | 6/2017 |
| JP | 2017-142577 A | 8/2017 |
| JP | 2019-133287 A | 8/2019 |
| JP | 2020-003873 A | 1/2020 |
| JP | 2021-131737 A | 9/2021 |
| JP | 2022-021537 A | 2/2022 |

OTHER PUBLICATIONS

JP Official Communication for JP Application No. 2024-524280, mailed on Sep. 9, 2025 with English Translation.

* cited by examiner

PHOTOGRAPHING SYSTEM AND PHOTOGRAPHING METHOD

This application is a National Stage Entry of PCT/JP2023/017487 filed on May 9, 2023, which claims priority from Japanese Patent Application 2022-088468 filed on May 31, 2022, the contents of all of which are incorporated herein by reference, in their entirety.

TECHNICAL FIELD

The present disclosure relates to a photographing system and a photographing method.

BACKGROUND ART

Various technologies for acquiring biological information used, for example, for departure/immigration examinations, from users have been disclosed. For example, Patent Literature 1 discloses a fingerprint reading apparatus that takes images of fingertips of a user by a plurality of cameras arranged side by side along a reading path through which the user passes his/her fingers.

CITATION LIST

Patent Literature

Patent Literature 1: Japanese Unexamined Patent Application Publication No. 2006-139592

SUMMARY OF INVENTION

Technical Problem

The fingerprint reading apparatus disclosed in Patent Literature 1 takes images of moving fingertips by cameras the positions of which are fixed. That is, the fingerprint reading apparatus disclosed in Patent Literature 1 takes images of fingertips that are moving relative to the cameras, so that there is a possibility that the images of the fingertips might be blurred.

The present disclosure has been made in order to solve such a problem, and an object thereof is to provide a photographing system and a photographing method capable of preventing a photographed image of a hand from being blurred.

Solution to Problem

A photographing system according to an aspect of the present disclosure includes a photographing unit, a guiding unit, and a photographing range adjustment unit. The photographing unit photographs a hand of a user. The guiding unit displays a guiding image serving as a mark for guiding the user in regard to where his/her hand should be positioned, the hand being an object to be photographed. Further, the guiding unit moves a position at which the guiding image is displayed along a predetermined trajectory. The photographing range adjustment unit adjusts a photographing range of the photographing unit to a position corresponding to the position at which the guiding image is displayed. Further, the photographing range adjustment unit adjusts the photographing range along the trajectory of the position at which the guiding image is displayed.

A photographing method according to an aspect of the present disclosure includes: displaying a guiding image serving as a mark for guiding a user in regard to where his/her hand should be positioned, the hand being an object to be photographed; moving a position at which the guiding image is displayed along a predetermined trajectory; adjusting a photographing range of a photographing unit to a position corresponding to the position at which the guiding image is displayed; adjusting the photographing range along the trajectory of the position at which the guiding image is displayed; and photographing the hand of the user.

EXAMPLE EMBODIMENT

Figure 1:
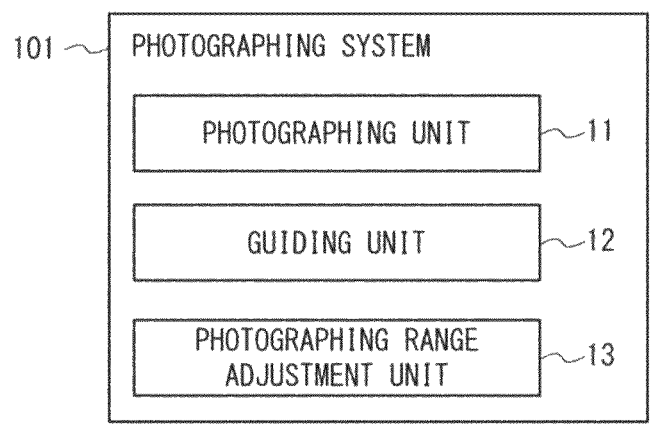
FIG. 1 is a block diagram showing a configuration of a photographing system according to a first example embodiment.

The present disclosure will be described hereinafter through an example embodiment, but the disclosure according to the claims is not limited to the below-shown example embodiment. Further, not all of the components/structures described in the example embodiment are essential as means for solving the problem. For clarity of explanation, the following description and drawings are omitted and simplified as appropriate. Note that the same reference numerals (or symbols) are assigned to the same elements throughout the drawings, and redundant descriptions thereof are omitted as appropriate.

First Example Embodiment (Configuration of Photographing System)

A photographing system according to a first example embodiment will be described hereinafter in detail with reference to the drawings. FIG. 1 is a block diagram showing a configuration of a photographing system according to the first example embodiment.

A photographing system 101 shown in FIG. 1 is used to acquire predetermined biological information from a hand of a user. The predetermined biological information is, for example, a fingerprint shape pattern, a vein shape pattern, or a combination thereof. The photographing system 101 includes, as main components thereof, a photographing unit 11, a guiding unit 12, and a photographing range adjustment unit 13.

The photographing unit 11 photographs a photographing range adjusted by the photographing range adjustment unit 13. The photographing unit 11 outputs the photographed image as image data.

The guiding unit 12 displays a guiding image for the user. Note that the guiding image in this specification is an image serving as a mark for guiding the user in regard to where his/her hand, which is the object to be photographed, should be positioned. For example, the guiding image may be displayed at a position at which the user is supposed to place his/her hand over the guiding image. The guiding unit 12 moves the position at which the guiding image is displayed along a predetermined trajectory. The guiding unit 12 may provide the position at which the guiding image is displayed and the predetermined trajectory thereof to the photographing range adjustment unit 13.

Note that the position at which the guiding image is displayed and the predetermined trajectory thereof may be set in advance in the guiding unit 12. Further, a control unit (not shown) may provide the position at which the guiding image is displayed and the predetermined trajectory thereof to the guiding unit 12.

The photographing range adjustment unit 13 adjusts the photographing range of the photographing unit 11 to a position corresponding to the position at which the guiding image is displayed. More specifically, the photographing range adjustment unit 13 adjusts the photographing range of the photographing unit 11 along the trajectory of the position at which the guiding image is displayed.

For example, the photographing range adjustment unit 13 may acquire coordinate information of the position at which the guiding image is displayed and that of the predetermined trajectory from the guiding unit 12. Then, the photographing range adjustment unit 13 may adjust the photographing range of the photographing unit based on the acquired coordinate information.

Further, the photographing range adjustment unit 13 may acquire coordinate information of the position at which the guiding image is displayed and that of the predetermined trajectory from, for example, a control unit (not shown). Then, the photographing range adjustment unit 13 may adjust the photographing range of the photographing unit based on the acquired coordinate information.

For example, the photographing range adjustment unit 13 may adjust the photographing range by adjusting the position of the photographing unit 11. Alternatively, the photographing range adjustment unit 13 may adjust the photographing range by adjusting, for example, the focal length of the photographing unit 11.

(Operation of Photographing System)

Figure 2:
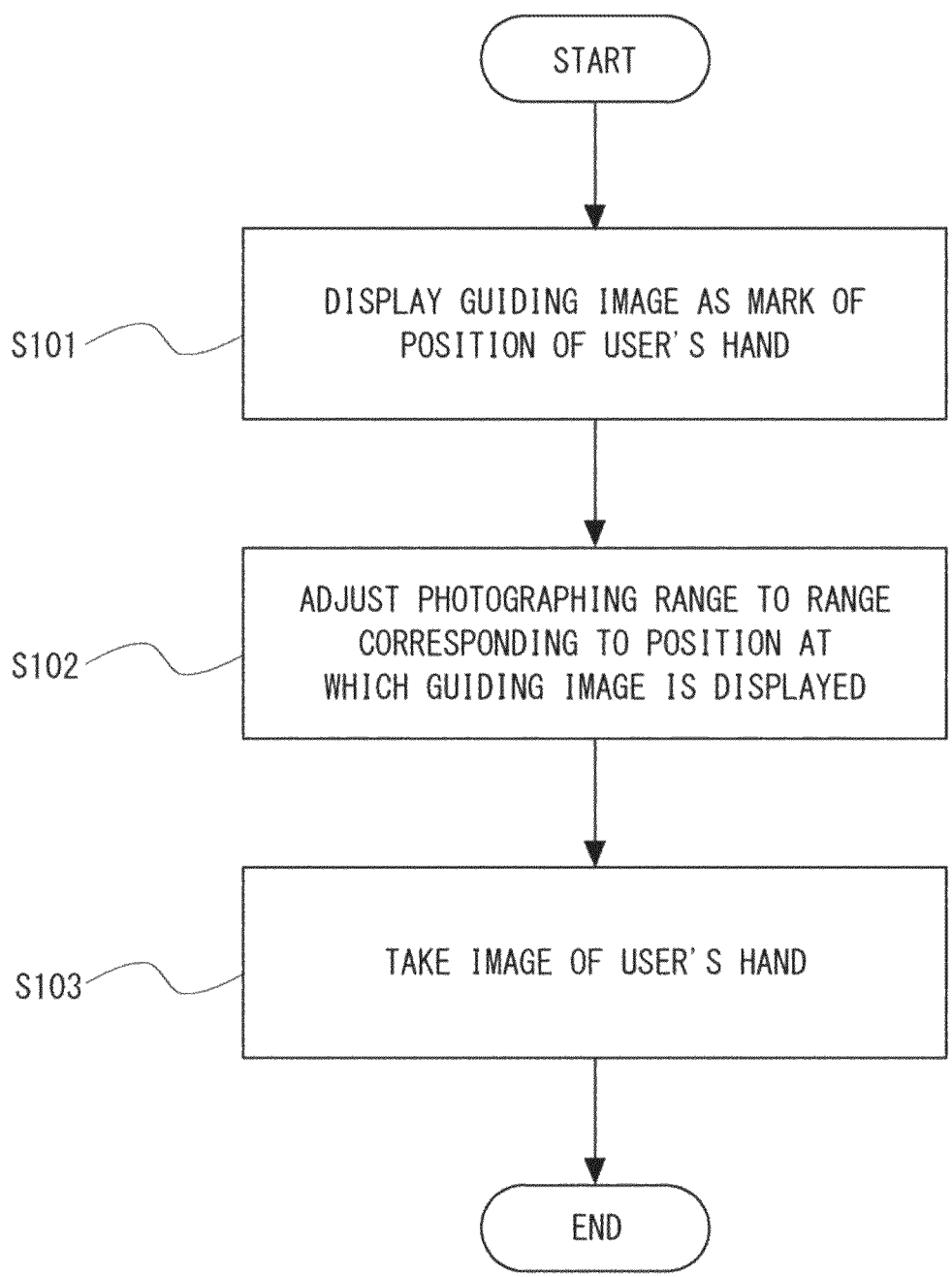
FIG. 2 is a flowchart showing a photographing method according to the first example embodiment.

Next, operations, i.e., a method, performed by the photographing system according to the first example embodiment will be described in detail with reference to the drawings. FIG. 2 is a flowchart showing operations performed by the photographing system according to the first example embodiment. Note that in the following description, FIG. 1 will be referred to as appropriate.

Firstly, the guiding unit 12 displays a guiding image serving as a mark of the position of a user's hand (Step S101). The guiding unit 12 moves the displayed position at which the guiding image is displayed along a predetermined trajectory.

Next, the photographing range adjustment unit 13 adjusts the photographing range to a position corresponding to the position at which the guiding image is displayed (Step S102). More specifically, the photographing range adjustment unit 13 adjusts the photographing range of the photographing unit 11 along the trajectory of the position at which the guiding image is displayed. That is, the photographing range adjustment unit 13 makes the guiding image and the photographing range of the photographing unit 11 move in a synchronized manner.

Lastly, the photographing unit 11 takes an image of the user's hand, and the photographing system 101 finishes the series of operations (Step S103). That is, the photographing unit 11 photographs the user's hand while following the guiding image (i.e., while making its photographing range follow the guiding image). The photographing unit 11 may store the photographed image in, for example, a storage unit (not shown). Further, the photographing unit 11 may output the photographed image to a system, such as a biometric authentication system, in which the image of the hand is used as biological information.

As described above, in the photographing system 101 according to this example embodiment, the guiding unit 12 displays the guiding image so that the user moves his/her hand so as to follow the guiding image. Then, the photographing unit 11 photographs the user's hand while following the guiding image (i.e., while making its photographing range follow the guiding image). That is, the photographing system 101 makes the guiding image and the photographing range of the photographing unit 11 move in a synchronized manner. In this way, the photographing system 101 can keep the state in which the hand, which is performing a predetermined movement, remains in the photographing range. Therefore, the photographing system 101 can prevent the image from being blurred due to the swaying or shaking of the user's hand.

Second Example Embodiment (Configuration of Photographing System)

Figure 3:
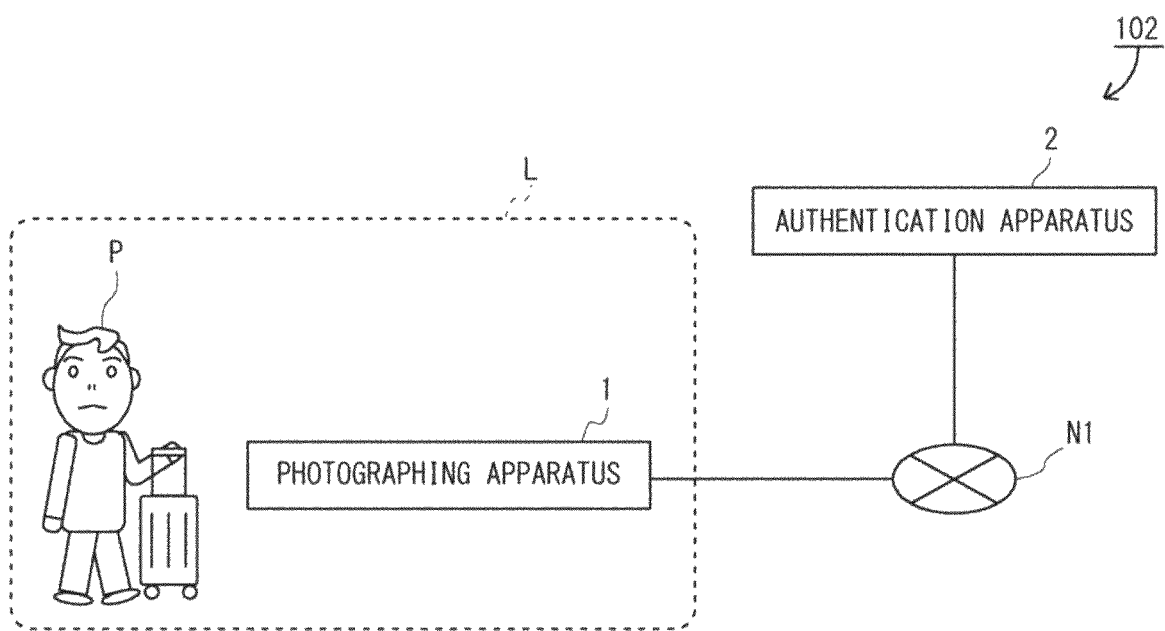
FIG. 3 is a block diagram showing a configuration of a photographing system according to a second example embodiment.

A photographing system according to a second example embodiment will be described hereinafter in detail with reference to the drawings. Firstly, a configuration of a photographing system according to the second example embodiment will be described. FIG. 3 is a block diagram showing a configuration of a photographing system according to the second example embodiment.

A photographing system 102 is a system for performing biometric authentication of a user who uses a facility such as an airport or a port. The photographing system 102 includes, as main components, a photographing apparatus 1 and an authentication apparatus 2. The photographing apparatus 1 and the authentication apparatus 2 are connected to each other through a network N1 so that they can communicate with each other. Note that the network N1 may be a telephone line, a wide area network, or a local area network.

The photographing apparatus 1 is installed, for example, in a certain airport L, and acquires biological information of a user P, who is a passenger. The photographing apparatus 1, which has acquired the biological information of the user P, provides the acquired biological information to the authentication apparatus 2. Upon receiving the biological information from the photographing apparatus 1, the authentication apparatus 2 authenticates the received biological information. The authentication apparatus 2, which has performed the authentication, provides information about the result of the authentication to the photographing apparatus 1. Upon receiving the information about the result of the authentication from the authentication apparatus 2, the photographing apparatus 1 displays the result of the authentication for the user P.

Figure 4:
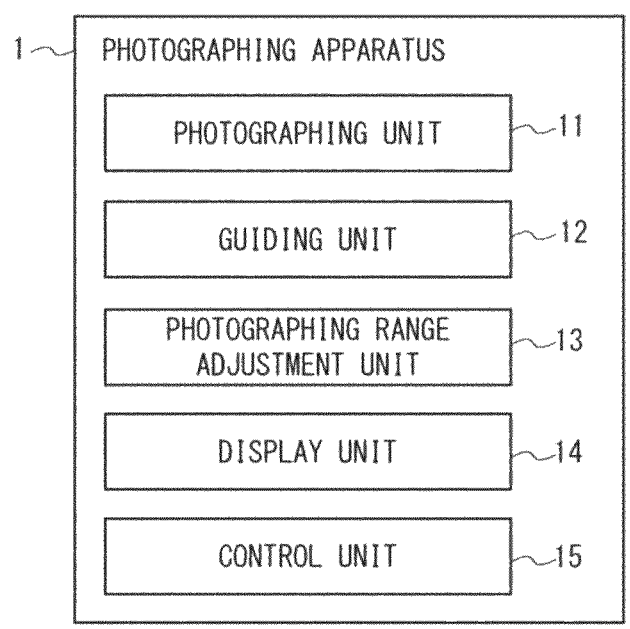
FIG. 4 is a block diagram showing a configuration of a photographing apparatus according to the second example embodiment.

Next, the configuration of the photographing apparatus 1 will be further described with reference to FIG. 4. FIG. 4 is a block diagram showing a configuration of the photographing apparatus 1 according to the second example embodiment. The photographing apparatus 1 includes, as main components, a photographing unit 11, a guiding unit 12, a photographing range adjustment unit 13, a display unit 14, and a control unit 15. These components included in the photographing apparatus 1 are connected to each other as appropriate so that the photographing apparatus 1 can carry out the functions described in the present disclosure.

The guiding unit 12 displays a guiding image serving as an indicator for guiding the user P to move his/her hand to a predetermined position. More specifically, the guiding unit 12 first receives information about the position at which the guiding image is displayed from the control unit 15. Then, the guiding unit 12 displays, by using the received information about the position at which the guiding image is displayed, the guiding image at this display position. Note that the guiding unit 12 according to this example embodiment may present (e.g., show) a message for guiding the user P to move his/her hand according to the guiding image (i.e., so as to follow the guiding image).

Figure 5:
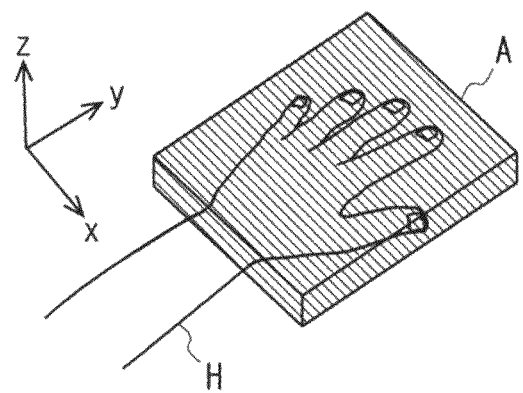
FIG. 5 is a schematic diagram showing a guiding image according to the second example embodiment.

FIG. 5 shows a guiding image according to the second example embodiment. As shown in FIG. 5, a guiding image A according to this example embodiment is a stereoscopic image formed in the air. The guiding unit 12 according to this example embodiment displays this guiding image A at a position at which the user P is supposed to place his/her hand H over the guiding image A.

Note that needless to say, a right-handed xyz-orthogonal coordinate system shown in FIG. 5 and those in other drawings are shown just for explaining a positional relationship among components. In this example embodiment, the z-axis positive direction is the vertically upward direction, and the xy-plane is a horizontal plane, both of which are common throughout the drawings. Further, it is assumed that the user P is standing so that the front of his/her body faces the positive side in the y-axis direction.

The guiding unit 12 moves the position at which the guiding image A is displayed along a predetermined trajectory. The guiding unit 12 according to this example embodiment moves the position of the guiding image A so that it reciprocates in the left/right direction as viewed from the user P. In other words, the guiding unit 12 moves the position at which the guiding image A is displayed so that it reciprocates in a direction parallel to the x-axis.

However, how to move the guiding image according to the present disclosure is not limited to the above-described example. For example, the guiding unit 12 may move the position of the guiding image A so that it reciprocates in a direction along a predefined arbitrary axis.

Further, the guiding unit 12 may move the position of the guiding image A so that, for example, it circulates along a predetermined arbitrary trajectory. Examples of the predetermined arbitrary trajectory may include an ellipse, a figure of eight, and a rectangle.

Further, the guiding unit 12 may move the position at which the guiding image A is displayed so that, for example, it rotates around a rotation axis parallel to the y-axis direction.

Figure 6:
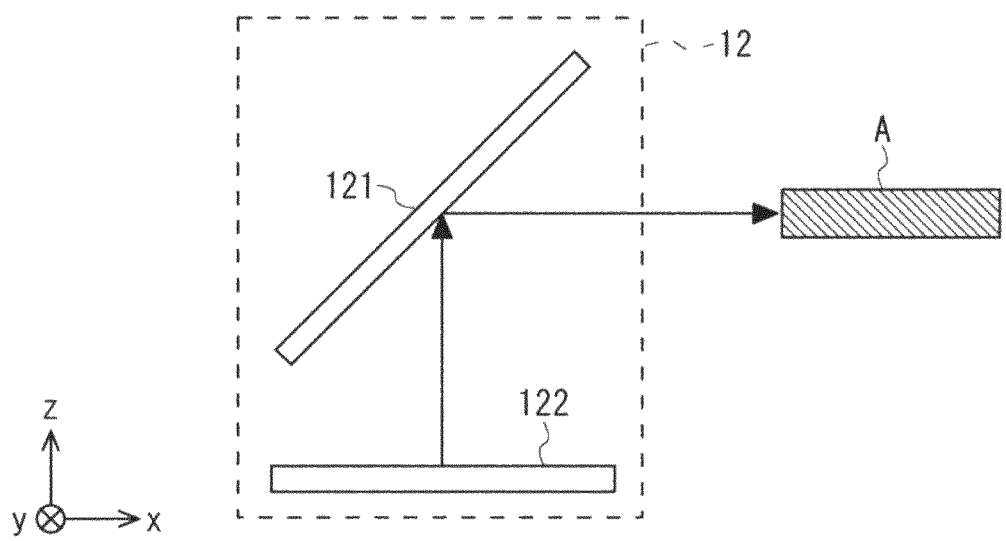
FIG. 6 is a schematic diagram showing a configuration of a guiding unit according to the second example embodiment.

FIG. 6 is a schematic diagram showing a configuration of a guiding unit according to the second example embodiment. The guiding unit 12 according to this example embodiment includes an optical image formation panel 121 and a display device 122. The optical image formation panel 121 reflects an image displayed on the display device 122 and thereby forms a reflected image in the air. The optical image formation panel 121 is, for example, an optical image formation panel disclosed in a patent literature such as Japanese Unexamined Patent Application Publication No. 2017-142577 or No. 2017-107218.

The guiding unit 12 according to this example embodiment displays a guiding image A on the display device 122. Then, the optical image formation panel 121 reflects the guiding image A displayed on the display device 122 and thereby forms the guiding image A in the air. Note that the guiding unit 12 can move, by moving the position of the guiding image A displayed on the display device 122, the position at which the guiding image A, which is formed in the air, is displayed.

As the guiding unit 12 moves the position at which the guiding image A is displayed, the user P moves his/her hand H so as to follow the guiding image A.

Note that the configuration of the guiding unit 12 according to the present disclosure is not limited to that shown in FIG. 6. Further, the structure of the guiding image according to the present disclosure is not limited to the stereoscopic image shown in FIG. 5. For example, the guiding unit 12 according to the present disclosure may have a configuration shown in FIG. 7.

Figure 7:
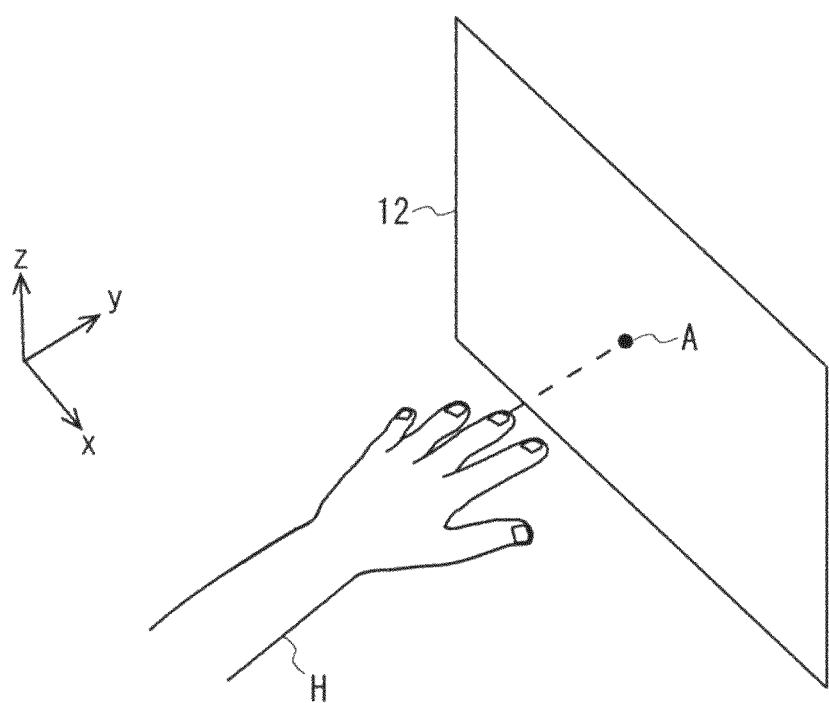
FIG. 7 is a schematic diagram showing another configuration of a guiding unit according to the second example embodiment.

A guiding unit 12 shown in FIG. 7 is a display device. Further, the guiding unit 12 displays a guiding image A on the display. In this case, for example, the photographing apparatus 1 may notify the user to align the position of a part of his/her hand, such as his/her middle finger, with the position at which the guiding image A is displayed. Note that in this case, the guiding unit 12 may also function as the display unit 14.

Further, the guiding image A according to the present disclosure may include, for example, a contour line or an area indicating the shape of the hand. According to the above-described configuration, the guiding unit 12 can suitably guide the user so as to move his/her hand to a predetermined position.

The photographing unit 11 is a camera for photographing the hand H of the user P. The photographing unit 11 photographs the hand H of the user P under the control of the control unit 15. More specifically, the photographing unit 11 receives an instruction from the control unit 15 and performs photographing at a timing included in the received instruction. Then, the photographing unit 11 outputs the photographed image to the control unit 15 as image data.

A photographing range to be photographed by the photographing unit 11 is adjusted by the photographing range adjustment unit 13 (which will be described later). For example, in the case where the photographing range adjustment unit 13 adjusts the position of the photographing unit 11 itself, the photographing unit 11 may perform photographing with a predetermined focal length according to the position to which the photographing unit 11 has been moved. Alternatively, in the case where the photographing range adjustment unit 13 adjusts, for example, the focal length, the photographing unit 11 may perform photographing with a focal length that is adjusted according to an instruction from the photographing range adjustment unit 13.

More specifically, the photographing range of the photographing unit 11 moves along the trajectory on which the guiding image A is moved. Then, the photographing unit 11 takes an image of the hand H of the user P which is following the guiding image A.

When the user P is moving his/her hand H as described above, it is desirable if the shaking of the hand H can be suppressed. To do so, by taking an image of the hand H of the user P while the user P is moving the hand H, the photographing unit 11 can prevent the image from being blurred due to the swaying or shaking of the user's hand.

Further, the photographing unit 11 may take an image of the hand H of the user P at a position at which the guiding image A, which is reciprocating, is turned back. When the user P moves the hand H according to the guiding image A (i.e., so as to follow the guiding image A), the hand H of the user P momentarily stops at the turn-back point while its shaking is suppressed. Therefore, by taking an image of the hand H of the user P at the above-described position, a clearer image can be taken.

The photographing range adjustment unit 13 adjusts the photographing range of the photographing unit 11 under the control of the control unit 15. More specifically, the photographing range adjustment unit 13 acquires information about the position (hereinafter also referred to as position information) of the photographing range from the control unit 15. Then, the photographing range adjustment unit 13 adjusts the photographing range of the photographing unit 11 to a position corresponding to the acquired position information.

Note that the position information of the photographing range is information that the photographing range adjustment unit 13 uses to know (i.e., acquire) the position of the photographing range determined by the control unit 15. For example, the position information of the photographing range may be information about the coordinates (hereinafter also referred to as coordinate information) of the photographing range.

Further, the position information of the photographing range may be an apparatus parameter value that the photographing range adjustment unit 13 uses to adjust the photographing range of the photographing unit 11. That is, the position information of the photographing range may be such a parameter value that when the photographing range adjustment unit 13 operates based on this parameter value, the photographing range of the photographing unit 11 is adjusted to the photographing range determined by the control unit 15.

Note that as will be described later, the control unit 15 determines the photographing range of the photographing unit 11 according to the position at which the guiding image is displayed. That is, the photographing range adjustment unit 13 adjusts the photographing range of the photographing unit 11 to a range corresponding to the position at which the guiding image is displayed.

Figure 8:
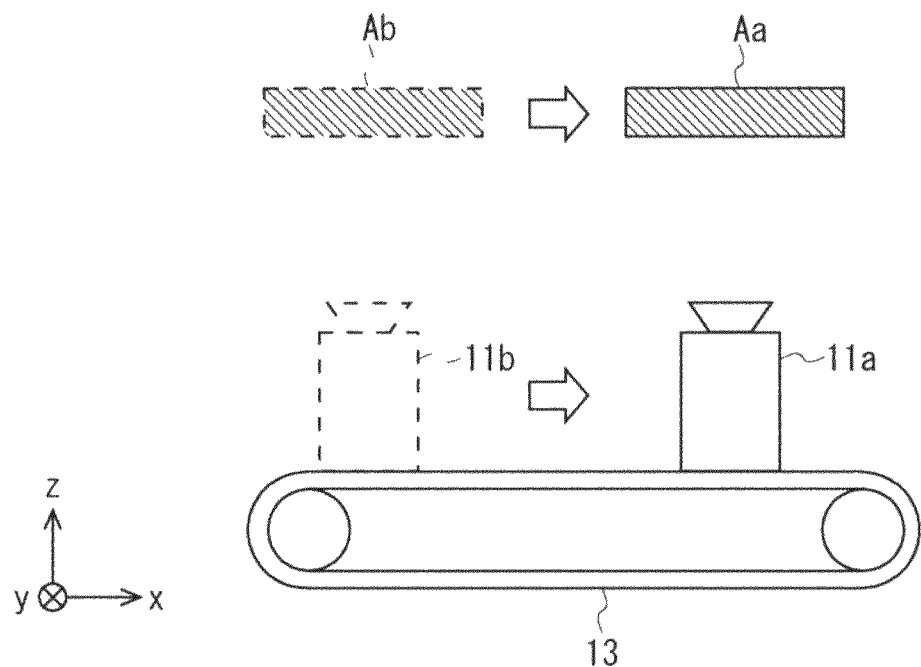
FIG. 8 is a schematic diagram showing a configuration of a photographing unit and a photographing range adjustment unit according to the second example embodiment.

FIG. 8 is a schematic diagram showing a configuration of the photographing unit and the photographing range adjustment unit according to the second example embodiment. The photographing range adjustment unit 13 according to this example embodiment adjusts the photographing range of the photographing unit 11 by moving the position of the photographing unit 11.

As shown in FIG. 8, the photographing range adjustment unit 13 according to this example embodiment is configured as a belt conveyor or any of other types of driving apparatus. Further, the photographing unit 11 according to this example embodiment is configured as a camera which is fixed to the photographing range adjustment unit 13 and the position of which is adjusted.

Note that a photographing unit 11a shown in FIG. 8 indicates the photographing unit 11 after being moved by the photographing range adjustment unit 13. Further, a photographing unit 11b shown in FIG. 8 indicates the photographing unit 11 before being moved by the photographing range adjustment unit 13. That is, the photographing unit 11b shown in FIG. 8 indicates the photographing unit 11 at the initial position.

Further, a guiding image Aa shown in FIG. 8 indicates the guiding image A at a timing when the photographing unit 11 is at the position indicated by the photographing unit 11a. Further, a guiding image Ab shown in FIG. 8 indicates the guiding image A at a timing when the photographing unit 11 is at the position indicated by the photographing unit 11b. That is, the guiding image Ab shown in FIG. 8 indicates the guiding image A at the initial position.

The photographing range adjustment unit 13 according to this example embodiment acquires, from the control unit 15, coordinate information defining the position of the photographing unit 11 as position information of the photographing range. In particular, in this example embodiment, the photographing range adjustment unit 13 acquires the x-coordinate of the guiding image A as coordinate information defining the position of the photographing unit 11. Then, the photographing range adjustment unit 13 moves the photographing unit 11 to a position corresponding to the acquired coordinates.

As described above, the guiding unit 12 according to this example embodiment moves the position at which the guiding image A is displayed so that it reciprocates in a direction parallel to the x-axis. Therefore, it is possible to, by using the x-coordinate of the guiding image A as the coordinate information defining the position of the photographing unit 11, synchronize the movement of the photographing unit 11 with the movement of the guiding image A. In other words, when the x-coordinate of the guiding image A is used as the coordinate information defining the position of the photographing unit 11, the relative velocity of the guiding image A viewed from the photographing unit 11 becomes zero.

In the configuration shown in FIG. 8, when the user P moves his/her hand so as to follow the guiding image A, the hand of the user P viewed from the photographing unit 11 is relatively stopped. Therefore, according to the above-described configuration, the photographing unit 11 can photograph the hand of the user P which is moving so as to follow the guiding image A.

However, the configuration of the photographing unit 11 and the photographing range adjustment unit 13 according to the present disclosure is not limited to the configuration shown in FIG. 8. For example, the configuration of the photographing unit 11 and the photographing range adjustment unit 13 may be a configuration shown in FIG. 9.

Figure 9:
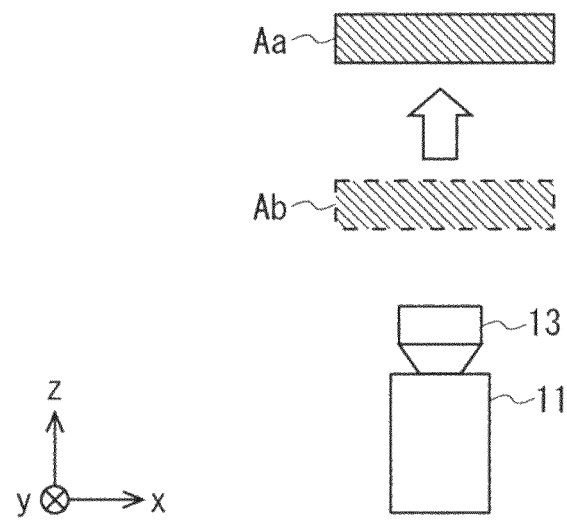
FIG. 9 is a schematic diagram showing another configuration of a photographing unit and a photographing range adjustment unit according to the second example embodiment.

FIG. 9 is a schematic diagram showing another configuration of the photographing unit and the photographing range adjustment unit according to the second example embodiment. In the configuration shown in FIG. 9, the guiding unit 12 moves the position at which the guiding image A is displayed in the vertical direction, i.e., in the z-axis direction.

The photographing range adjustment unit 13 shown in FIG. 9 is attached to the photographing unit 11 and is configured as a zoom lens capable of automatically adjusting a focal length. The photographing range adjustment unit 13 shown in FIG. 9 acquires, from the control unit 15, a focal length as position information of the photographing range. Then, the focal length is adjusted to the acquired focal length.

Note that the focal length calculated by the control unit 15 is calculated by the control unit 15 based on the position of the guiding image A. More specifically, the control unit 15 calculates the focal length so that the hand or the like is in focus at the position at which the guiding image A is displayed.

In the configuration shown in FIG. 9, when the user P moves his/her hand so as to follow the guiding image A, the user's hand as seen from the photographing unit 11 is continuously kept in focus. Therefore, by this configuration, the photographing unit 11 can photograph the hand of the user P which is moving so as to follow the guiding image A.

Figure 10:
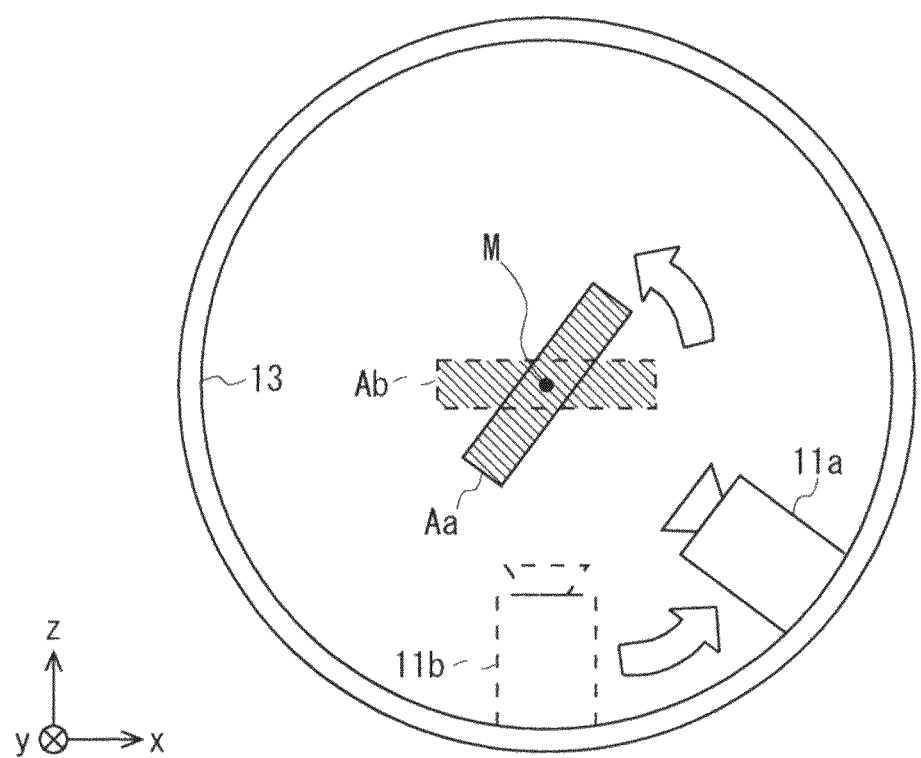
FIG. 10 is a schematic diagram showing another configuration of a photographing unit and a photographing range adjustment unit according to the second example embodiment.

Further, for example, the configuration of the photographing unit 11 and the photographing range adjustment unit 13 may be a configuration shown in FIG. 10. FIG. 10 is a schematic diagram showing another configuration of the photographing unit and the photographing range adjustment unit according to the second example embodiment. In the configuration shown in FIG. 10, the guiding unit 12 moves the position at which the guiding image A is displayed so as to rotate around a rotation axis M parallel to the y-axis direction.

The photographing range adjustment unit 13 according to this example embodiment is configured as a circular apparatus with the photographing unit 11 attached on the inner side thereof. The photographing range adjustment unit 13 rotates in itself and thereby changes the position and angle of the photographing unit 11. Note that the rotation axis M of the guiding image A coincides with the central axis of the photographing range adjustment unit 13.

The photographing range adjustment unit 13 shown in FIG. 10 acquires, from the control unit 15, the rotation angle of the guiding image A as position information of the photographing range. Then, the photographing range adjustment unit 13 rotates by the acquired rotation angle, and thereby changes the position and angle of the photographing unit 11.

In the configuration shown in FIG. 10, when the user P rotates his/her hand according to the guiding image A (i.e., so as to follow the guiding image A), the hand of the user P viewed from the photographing unit 11 is relatively stopped. Therefore, according to the above-described configuration, the photographing unit 11 can photograph the hand of the user P which is moving so as to follow the guiding image A.

A typical example of the display unit 14 is a display device. The display unit 14 displays a notification or information for the user P. For example, the display unit 14 may display an explanation about the guiding image A for the user P. That is, the display unit 14 may display a message urging the user P to hold his/her hand over the guiding image A. Further, the display unit 14 may display information about the result of the authentication acquired from the authentication apparatus 2 for the user P. Note that the display unit 14 may have a speaker device for playing back a voice message.

The control unit 15 controls the photographing unit 11, the guiding unit 12, the photographing range adjustment unit 13, and the display unit 14. Further, the control unit 15 outputs biological information acquired from the user P, i.e., image data of the hand of the user P, to the authentication apparatus 2. Further, the control unit 15 acquires information related to the result of the authentication from the authentication apparatus 2.

The control unit 15 may be implemented by, for example, an arithmetic unit such as a CPU (Central Processing Unit) (not shown) and a storage unit such as a RAM (Random Access Memory) or a ROM (Read Only Memory) in which programs, data, and the like for controlling the arithmetic unit are stored, and/or may be implemented as a single apparatus or a component. That is, the control unit 15 may be implemented as software or may be implemented as hardware.

As described above, the control unit 15 controls the guiding unit 12. The control unit 15 provides information on the position at which the guiding image is displayed to the guiding unit 12. Note that the information on the position at which the guiding image is displayed is, for example, coordinates of the position at which the guiding image is displayed. Further, the information on the position at which the guiding image is displayed may include coordinate information of a predetermined trajectory.

As described above, the control unit 15 controls the photographing range adjustment unit 13. The control unit 15 determines the photographing range of the photographing unit 11 based on the information about the position at which the guiding image is displayed provided to the guiding unit 12. Then, the control unit 15 outputs the position information of the determined photographing range to the photographing range adjustment unit 13.

As described above, the control unit 15 controls the photographing unit 11. The control unit 15 notifies the photographing unit 11 of a timing at which the photographing unit 11 photographs the hand of the user P. Then, the control unit 15 makes the photographing unit 11 take an image of the hand of the user P. The control unit 15 acquires the image taken by the photographing unit 11 as image data and outputs the acquired image to the authentication apparatus 2 as biological information.

The control unit 15 may control a timing at which the photographing unit 11 photographs the hand of the user P based on the position at which the guiding image is displayed and the position of the photographing range. For example, the control unit 15 may control the photographing unit 11 so that the photographing unit 11 photographs the hand of the user P at a timing when the position at which the guiding image is displayed and the position of the photographing range reach the turn-back point. Note that the control unit 15 may control the photographing unit 11 so as to repeatedly perform photographing at predetermined intervals.

The control unit 15 may determine whether or not the photographed image taken by the photographing unit 11 has quality satisfactory enough to be used for authentication. Whether or not the image has quality satisfactory enough to be used for authentication may be evaluated, for example, by measuring the contrast, sharpness, or the like in a predetermined area in the image. When the control unit 15 determines that the acquired image has quality satisfactory enough to be used for authentication, it may notify the photographing unit 11, the guiding unit 12, and the photographing range adjustment unit 13 to finish their respective operations.

The control unit 15 may control the display unit 14 so as to notify the user that the photographing was finished at a timing when it has determined that the acquired image has quality satisfactory enough to be used for authentication. In this case, for example, the control unit 15 may output a text message indicating that the photographing has been finished to the display unit 14, and make the display unit 14 display this text message. Further, for example, the control unit 15 may output voice data (or audio data) indicating that the photographing has been finished to the display unit 14, and thereby make a speaker included in the display unit 14 play back this voice data.

When no photographed image which is determined to have quality satisfactory enough to be used for authentication has been able be acquired within a predetermined time, the control unit 15 may output a warning message for the user to the display unit 14. Then, in this case, the control unit 15 makes the display unit 14 display this warning message.

Further, when no photographed image which is determined to have quality satisfactory enough to be used for authentication has been able to be acquired even after the guiding image A is reciprocated a predetermined number of times, the control unit 15 may also output a warning message to the display unit 14. Then, in this case, the control unit 15 makes the display unit 14 display the warning message.

In this case, the warning message may include, for example, a message urging the user P to contact a staff member or the like. Further, this warning message may include, for example, a message urging the user P to select whether or not to perform photographing again. Then, when the user P selects not to perform photographing again, the control unit 15 may further display a message urging the user to contact a staff member or the like.

When no photographed image which is determined to have quality satisfactory enough to be used for authentication has been able be acquired within a predetermined time, the control unit 15 may change the display mode of the guiding image A. Note that the display mode in this example is, for example, the position at which the guiding image A is displayed. Alternatively, the display mode may be, for example, the trajectory of the guiding image. More specifically, the display mode may be the shape of the trajectory of the guiding image or the size of the shape of the trajectory. More specifically, for example, when the control unit 15 has failed in photographing in which it has displayed a guiding image moving on an elliptic trajectory, the control unit 15 may attempt photographing again in which it displays a guiding image moving on a rectangular trajectory. Further, the display mode may be, for example, the moving speed of the guiding image.

Operation of Photographing System

Figure 11:
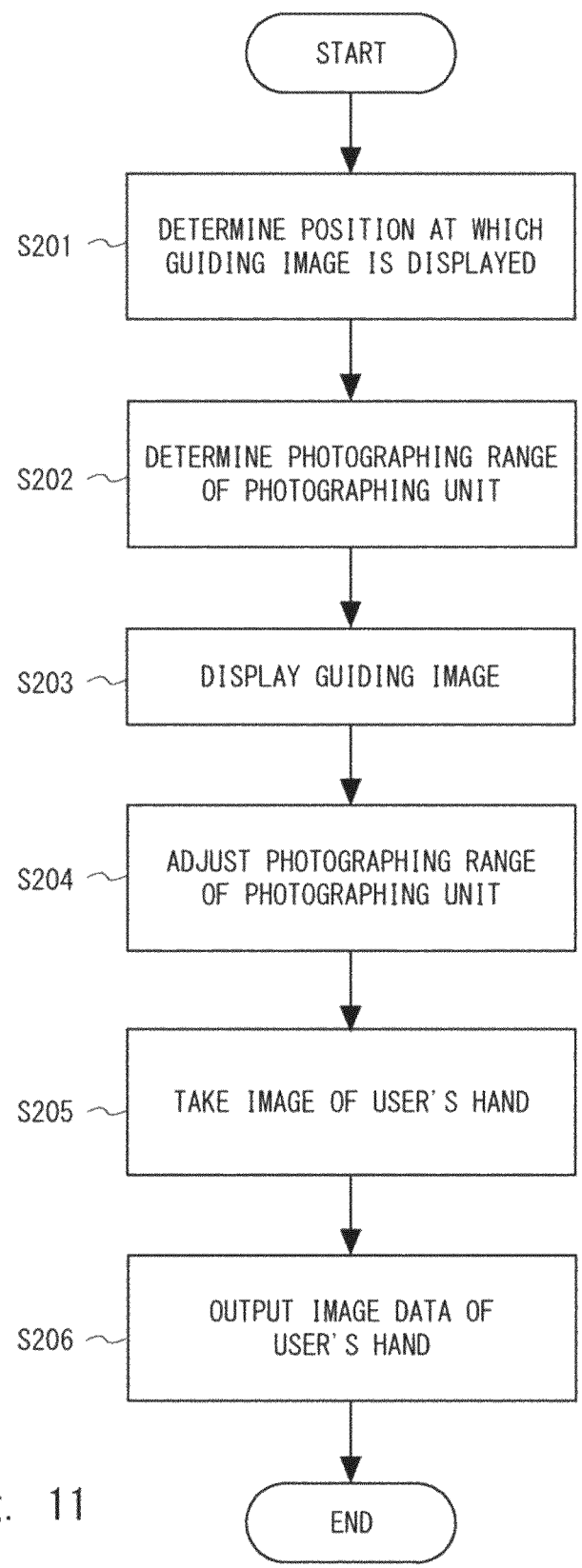
FIG. 11 is a flowchart showing a photographing method according to the second example embodiment.

Next, operations, i.e., a method, performed by the photographing system according to the second example embodiment will be described in detail with reference to the drawings. FIG. 11 is a flowchart showing operations performed by the photographing system according to the second example embodiment. Note that in the following description, FIG. 4 will be referred to as appropriate.

Firstly, the control unit 15 determines the position at which the guiding image is displayed (Step S201). The control unit 15 provides the determined position at which the guiding image is displayed to the guiding unit 12.

Next, the control unit 15 determines the photographing range of the photographing unit 11 (Step S202). More specifically, the control unit 15 determines the photographing range of the photographing unit 11 based on information about the position at which the guiding image is displayed, determined in the step S201. The control unit 15 provides the determined photographing range to the photographing range adjustment unit 13.

Next, the guiding unit 12 displays the guiding image (Step S203). Then, the photographing range adjustment unit 13 adjusts the photographing range of the photographing unit 11 (Step S204). Note that the steps S203 and S204 are performed in parallel with each other.

In the step S203, the guiding unit 12 displays a guiding image while moving it along a predetermined trajectory. Further, in the step S204, the photographing range adjustment unit 13 moves the photographing range of the photographing unit 11 along the trajectory along which the guiding image is moved.

Next, the photographing unit 11 takes an image of a hand of a user (Step S205). Note that the step S205 is performed at a timing when the steps S203 and S204 are being performed. That is, the photographing unit 11 photographs the user's hand at the timing when the guiding image is being moved along the predetermined trajectory. The photographing unit 11 provides the photographed image to the control unit 15 as image data. Note that in the above-described processes, the photographing unit 11 and the control unit 15 may provide a predetermined warning for the user, change the display mode of the guiding image, or photograph the user's hand a plurality of times by the above-described functions.

Lastly, the control unit 15 outputs the image data of the user's hand, and the photographing apparatus 1 finishes the series of operations (Step S206). More specifically, the control unit 15 outputs the image data of the user's hand to the authentication apparatus 2 as biological information of the user. The photographing apparatus 1 may repeatedly perform the series of operations described above until it acquires authentication information from the authentication apparatus 2.

As described above, the photographing apparatus 1 according to this example embodiment displays the guiding image so that the user moves his/her hand so as to follow the guiding image. Then, the photographing unit 11 photographs the user's hand while following the guiding image. Then, the photographing unit 11 photographs the user's hand which is moving so as to follow the guiding image.

When the user is moving his/her hand, it is desirable if the shaking of the user's hand can be suppressed. To do so, by adopting the above-described configuration, the photographing system 102 according to this example embodiment can take an image of the user's hand while suppressing the shaking of the user's hand. As a result, the photographing system 102 according to this example embodiment can prevent the photographed image of the hand from being blurred.

Third Example Embodiment

A photographing system according to a third example embodiment will be described hereinafter in detail with reference to the drawings. The photographing system according to this example embodiment is an example of an application of the photographing system 102 according to the second example embodiment.

Similarly to the photographing system 102 according to the second example embodiment, the photographing system according to the third example embodiment includes a photographing apparatus 1 and an authentication apparatus 2. That is, the photographing system according to the third example embodiment has a configuration similar to that shown in FIG. 3.

Figure 12:
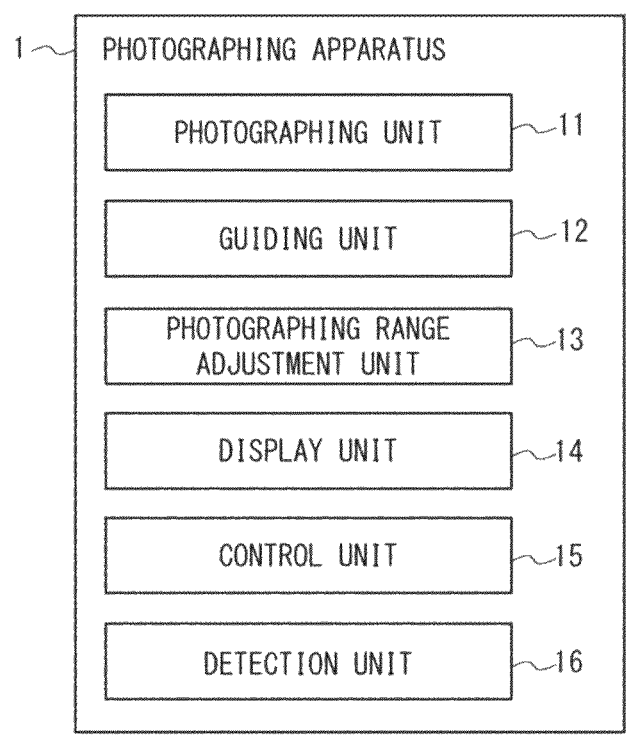
FIG. 12 is a block diagram showing a configuration of a photographing apparatus according to a third example embodiment.

FIG. 12 is a block diagram showing a configuration of the photographing apparatus 1 according to the third example embodiment. The photographing system according to the third example embodiment is different from the photographing system 102 according to the second example embodiment in that it includes a detection unit 16.

The detection unit 16 is a sensor for detecting a hand of a user P. The detection unit 16 detects the hand of the user P present at a position indicated by a guiding image. The detection unit 16 notifies the guiding unit 12 whether or not the hand of the user P is present at the position indicated by the guiding image. The guiding unit 12 changes the shape, color tone, or both of them of the guiding image according to whether or not the hand of the user P is present at the position indicated by the guiding image.

Further, when the hand of the user P is not present at the position indicated by the guiding image, the detection unit 16 may notify the display unit 14 to that effect. Then, upon being notified from the detection unit 16 that the hand of the user P is not present at the position indicated by the guiding image, the display unit 14 provides a warning to the user. Further, the display unit 14 may also provide a message for explaining an appropriate motion of the hand when providing the warning.

According to the above-described configuration, the photographing apparatus 1 according to this example embodiment can notify the user whether or not the motion of his/her hand he/she is performing is appropriate. Further, when the user is not performing an appropriate motion of the hand, the photographing apparatus 1 can urge the user to perform the appropriate motion of the hand.

Fourth Example Embodiment

A photographing system according to a fourth example embodiment will be described hereinafter in detail with reference to the drawings. The photographing system according to this example embodiment is an example of an application of the photographing system 102 according to the second example embodiment.

Similarly to the photographing system 102 according to the second example embodiment, the photographing system according to the fourth example embodiment includes a photographing apparatus 1 and an authentication apparatus 2. That is, the photographing system according to the fourth example embodiment has a configuration similar to that shown in FIG. 3.

Figure 13:
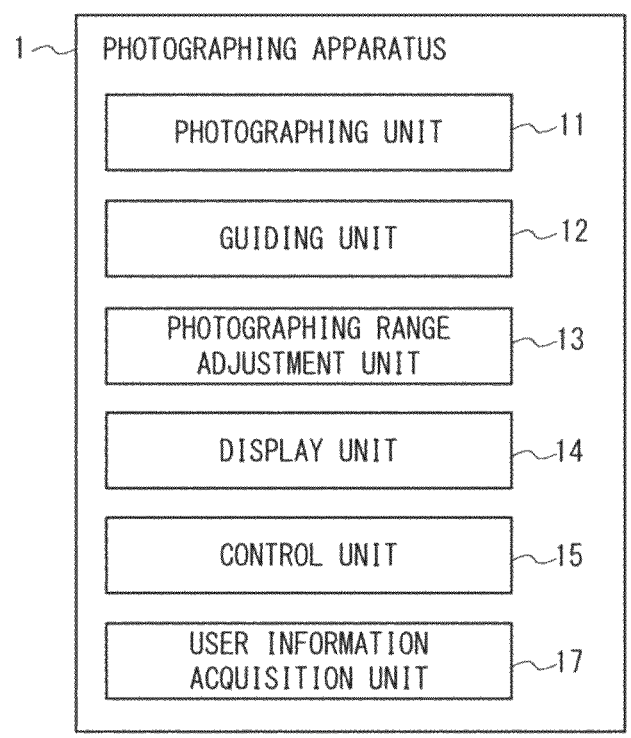
FIG. 13 is a block diagram showing a configuration of a photographing apparatus according to a fourth example embodiment.

FIG. 13 is a block diagram showing a configuration of the photographing apparatus 1 according to the fourth example embodiment. The photographing system according to the fourth example embodiment is different from the photographing system 102 according to the second example embodiment in that it includes a user information acquisition unit 17.

The user information acquisition unit 17 acquires physical information of a user P. Note that the physical information of the user P in this example means information related to a physical characteristic(s) of the user P that may affect his/her motion or the like when he/she moves his/her hand according to the guiding image A (i.e., so as to follow the guiding image A). The physical information of the user P is, for example, the age or height of the user P.

The user information acquisition unit 17 outputs the acquired physical information of the user P to the guiding unit 12. Then, the guiding unit 12 determines the position at which the guiding image is displayed based on the information acquired by the user information acquisition unit 17.

For example, the guiding unit 12 may adjust the height at which the guiding image is displayed based on the height of the user P. In this case, the guiding unit 12 may display the guiding image in such a manner that the higher the user P is, the higher position the guiding image is displayed at.

Further, for example, the guiding unit 12 may adjust the speed at which the guiding image is moved based on the age of the user P. In this case, the guiding unit 12 may adjust the speed at which the guiding image is moved so that when the user P is a child or an elderly person, the speed is lowered.

According to the above-described configuration, the user can easily perform an appropriate motion of his/her hand. As a result, the photographing system according to this example embodiment can reduce the burden on the user.

In the above-described examples, the program includes a set of instructions (or software codes) that, when being loaded into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Although the present disclosure is described above with reference to example embodiments, the present disclosure is not limited to the above-described example embodiments. Various modifications that can be understood by those skilled in the art can be made to the configuration and details of the present disclosure within the scope of the disclosure.

The whole or part of the example embodiments disclosed above can be described as, but not limited to, the following supplementary notes.

(Supplementary Note 1)

A photographing system comprising:

a photographing unit configured to photograph a hand of a user;

a guiding unit configured to display a guiding image serving as a mark for guiding the user in regard to where his/her hand should be positioned, the hand being an object to be photographed; and a photographing range adjustment unit configured to adjust a photographing range of the photographing unit to a position corresponding to a position at which the guiding image is displayed, wherein the guiding unit moves the position at which the guiding image is displayed along a predetermined trajectory, and the photographing range adjustment unit adjusts the photographing range along the trajectory of the position at which the guiding image is displayed.

(Supplementary Note 2)

The photographing system described in Supplementary Note 1, further comprising a control unit configured to control the guiding unit and the photographing range adjustment unit, wherein the control unit determines the position at which the guiding image is displayed, displayed by the guiding unit, and determines the photographing range corresponding to the position at which the guiding image is displayed.

(Supplementary Note 3)

The photographing system described in Supplementary Note 1 or 2, further comprising a detection unit configured to detect a position of the hand of the user, wherein the guiding unit changes a shape, a color tone, or both of them of the guiding image based on a result of the detection by the detection unit.

(Supplementary Note 4)

The photographing system described in Supplementary Note 3, wherein when the detection unit does not detect the hand of the user, a warning is provided to the user.

(Supplementary Note 5)

The photographing system described in any one of Supplementary Notes 1 to 4, wherein the guiding unit moves the position at which the guiding image is displayed in a reciprocating manner, and the photographing unit takes an image of the hand of the user at a position where the position at which the guiding image is displayed is turned back.

(Supplementary Note 6)

The photographing system described in any one of Supplementary Notes 1 to 5, further comprising a user information acquisition unit configured to acquire physical information of the user, wherein the guiding unit determines the position at which the guiding image is displayed based on the physical information acquired by the user information acquisition unit.

(Supplementary Note 7)

The photographing system described in any one of Supplementary Notes 1 to 6, wherein the guiding image is a stereographically-projected image.

(Supplementary Note 8)

The photographing system described in any one of Supplementary Notes 1 to 7, wherein the photographing range adjustment unit adjusts the photographing range of the photographing unit by moving a position of the photographing unit.

(Supplementary Note 9)

The photographing system described in any one of Supplementary Notes 1 to 7, wherein the photographing range adjustment unit adjusts the photographing range of the photographing unit by adjusting a focal length of the photographing unit.

(Supplementary Note 10)

A photographing method comprising:

displaying a guiding image serving as a mark for guiding a user in regard to where his/her hand should be positioned, the hand being an object to be photographed;

moving a position at which the guiding image is displayed along a predetermined trajectory;

adjusting a photographing range to a position corresponding to the position at which the guiding image is displayed along a trajectory of the position at which the guiding image is displayed; and photographing the hand of the user.

This application is based upon and claims the benefit of priority from Japanese patent application No. 2022-088468, filed on May 31, 2022, the disclosure of which is incorporated herein in its entirety by reference.

REFERENCE SIGNS LIST

1 PHOTOGRAPHING APPARATUS
2 AUTHENTICATION APPARATUS
11 PHOTOGRAPHING UNIT
12 GUIDING UNIT
121 OPTICAL IMAGE FORMATION PANEL
122 DISPLAY UNIT
13 PHOTOGRAPHING RANGE ADJUSTMENT UNIT
14 DISPLAY UNIT
15 CONTROL UNIT
16 DETECTION UNIT
17 USER INFORMATION ACQUISITION UNIT
101, 102 PHOTOGRAPHING SYSTEM

What is claimed is:

1. A photographing system comprising:
a photographing unit implemented at least by a hardware and configured to photograph a hand of a user;
a guiding unit implemented at least by the hardware and configured to display a guiding image serving as a mark for guiding the user in regard to where his/her hand should be positioned, the hand being an object to be photographed; and
a photographing range adjustment unit implemented at least by the hardware and configured to adjust a photographing range of the photographing unit to a position corresponding to a position at which the guiding image is displayed, wherein
the guiding unit moves the position at which the guiding image is displayed along a predetermined trajectory, and the photographing range adjustment unit adjusts the photographing range along the trajectory of the position at which the guiding image.

2. The photographing system according to claim 1, wherein
the guiding unit moves the position at which the guiding image is displayed in a reciprocating manner, and
the photographing unit takes an image of the hand of the user at a position where the position at which the guiding image is displayed is turned back.

3. The photographing system according to claim 1, further comprising user information acquisition unit implemented at least by the hardware and configured to acquire physical information of the user, wherein
the guiding unit determines the position at which the guiding image is displayed based on the physical information acquired by the user information acquisition unit.

4. The photographing system according to claim 1, wherein the guiding image is a stereographically-projected image.

5. The photographing system according to claim 1, wherein the photographing range adjustment unit adjusts the photographing range of the photographing unit by moving a position of the photographing unit.

6. The photographing system according to claim 1, wherein the photographing range adjustment unit adjusts the photographing range of the photographing unit by adjusting a focal length of the photographing unit.

7. The photographing system according to claim 1, further comprising:
- at least one memory storing instructions, and
- at least one processor configured to execute the instructions to;
- control the guiding means and the photographing range adjustment means, wherein
- the at least one processor configured to determine the position at which the guiding image is displayed, displayed by the guiding unit, and determine the photographing range corresponding to the position at which the guiding image is displayed.

8. The photographing system according to claim 2, further comprising a detection unit implemented at least by the hardware and configured to detect a position of the hand of the user, wherein
- the guiding unit changes a shape, a color tone, or both of them of the guiding image based on a result of the detection by the detection unit.

9. The photographing system according to claim 3, wherein when the detection unit does not detect the hand of the user, a warning is provided to the user.

10. A photographing method comprising:
- displaying a guiding image serving as a mark for guiding a user in regard to where his/her hand should be positioned, the hand being an object to be photographed;
- moving a position at which the guiding image is displayed along a predetermined trajectory;
- adjusting a photographing range to a position corresponding to the position at which the guiding image is displayed along a trajectory of the position at which the guiding image is displayed; and
- photographing the hand of the user.

* * * * *